United States Patent [19]

Seelen et al.

[11] Patent Number: 5,277,382
[45] Date of Patent: Jan. 11, 1994

[54] AIRCRAFT ENGINE FORWARD MOUNT

[75] Inventors: Laurence Seelen, Cincinnati; Thomas P. Joseph; Hahn M. Spofford, both of West Chester; Charles S. Orkiszewski, Cincinnati, all of Ohio

[73] Assignee: General Electric Company, Cincinnati, Ohio

[21] Appl. No.: 959,885

[22] Filed: Oct. 13, 1992

[51] Int. Cl.⁵ .............................................. B64D 27/00
[52] U.S. Cl. ..................................... 244/54; 248/554; 248/555
[58] Field of Search ................... 244/54; 248/554, 555, 248/556, 557; 60/39.31

[56] References Cited

U.S. PATENT DOCUMENTS

| | | | |
|---|---|---|---|
| 4,361,296 | 11/1982 | Hall et al. | 244/54 |
| 4,725,019 | 2/1988 | White | 244/54 |
| 5,181,675 | 1/1993 | Lardellier et al. | 248/554 |

FOREIGN PATENT DOCUMENTS

| | | | |
|---|---|---|---|
| 2013786 | 8/1979 | United Kingdom | 60/39.31 |
| 2202279 | 9/1988 | United Kingdom | 244/54 |

*Primary Examiner*—Michael S. Huppert
*Assistant Examiner*—Anne E. Bidwell
*Attorney, Agent, or Firm*—Jerome C. Squillaro

[57] ABSTRACT

An aircraft engine mount includes an annular casing fixedly disposed in the engine, a mounting platform spaced radially outwardly from the casing and fixedly joinable to an aircraft pylon, and a pair of circumferentially spaced apart links pivotally joined to the platform and the casing at respective radially outer and inner joints. The inner joints are circumferentially spaced closer together than the outer joints so that the intersection point of the longitudinal axes of the two links is disposed radially below the two links themselves for reducing lateral deflection of the casing relative to the engine mount.

8 Claims, 3 Drawing Sheets

AIRCRAFT ENGINE FORWARD MOUNT

The present invention relates generally to aircraft mounted gas turbine engines, and, more specifically, to a mount for supporting an engine to a wing or tail pylon.

BACKGROUND OF THE INVENTION

A gas turbine engine is typically mounted below an aircraft wing or within an aircraft tail section by a pylon. The engine is typically mounted at its forward end, at an intermediate section, and at its aft end for transmitting loads to the pylon through respective forward, thrust, and aft mounts. The loads typically include vertical loads such as the weight of the engine itself, axial loads due to the thrust generated by the engine, side loads such as those due to wind buffeting, and roll loads or torques in three planes. The mounts must also accommodate both axial and radial thermal expansion and contraction of the engine relative to the supporting pylon.

Both the forward and aft mounts are typically provided for carrying in-plane loads to the pylon, which in-plane loads are those occurring in a single axial plane extending perpendicularly outwardly from the longitudinal axis of the engine and include vertical and horizontal loads and rotary torque or moments. The thrust mount is provided for transferring the axially directed thrust loads from the engine to the pylon which are tension loads during forward propulsion of the aircraft, and compression loads which occur during the use of the engines' thrust reverser during braking of the aircraft upon landing.

The forward mount typically joins either the core engine or the fan frame outer casing to the pylon, with the latter being disposed radially outwardly of the former. A forward mount typically includes a pair of circumferentially spaced apart links pivotally joined at opposite ends thereof to the fan frame outer casing and a mounting platform fixedly joined to the pylon. These links are typically inclined generally tangentially to the outer casing and radially outwardly toward each other so that the intersection point of their respective longitudinal axes is disposed radially outwardly of the outer casing in an inverted V-shaped configuration.

The intersection point acts as a center of rotation, or pendulum pivot point, about which the forward end of the engine tends to pivot in a pendulum fashion during operation which can lead to elastic lateral deflection of the engine at the forward mount relative to the pylon. These lateral deflections must be taken into account in designing interconnections between the engine and the pylon which include, for example, customer bleed piping. A portion of compressor air from the engine is typically bled through pipes to the aircraft for conventional use therein. Since the bleed pipes are connected directly to the engine, any lateral deflection of the engine will in turn cause deflection of the bleed pipes which must be accommodated to prevent excessive stress therein. By locating the forward mount links above the fan frame outer casing, and by having outwardly inclined links with the intersection point thereof being further disposed radially outwardly from the fan frame outer casing, the pendulum-type rotation of the engine is increased which can increase the lateral deflection of the engine which must be accommodated to prevent damage to the bleed pipes.

Since the aft mount is typically located radially above the point at which the side loads act on the engine, the side loads will induce roll moments at the aft mount, and yaw moments on the engine in a horizontal plane. If the center of rotation of the pendulum-type movement of the fan frame is located radially above the support of the engine at its aft mount, then side loads on the engine will effect additional roll moment at the aft mount. Accordingly, side loads acting on the engine will effect both lateral displacement of the fan frame itself as well as induce roll moments at the aft mount which must be suitably accommodated for obtaining acceptable stresses in both the forward and aft mounts and in the bleed pipes.

SUMMARY OF THE INVENTION

An aircraft engine mount includes an annular casing fixedly disposed in the engine, a mounting platform spaced radially outwardly from the casing and fixedly joinable to an aircraft pylon, and a pair of circumferentially spaced apart links pivotally joined to the platform and the casing at respective radially outer and inner joints. The inner joints are circumferentially spaced closer together than the outer joints so that the intersection point of the longitudinal axes of the two links is disposed radially below the two links themselves for reducing lateral deflection of the casing relative to the engine mount.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
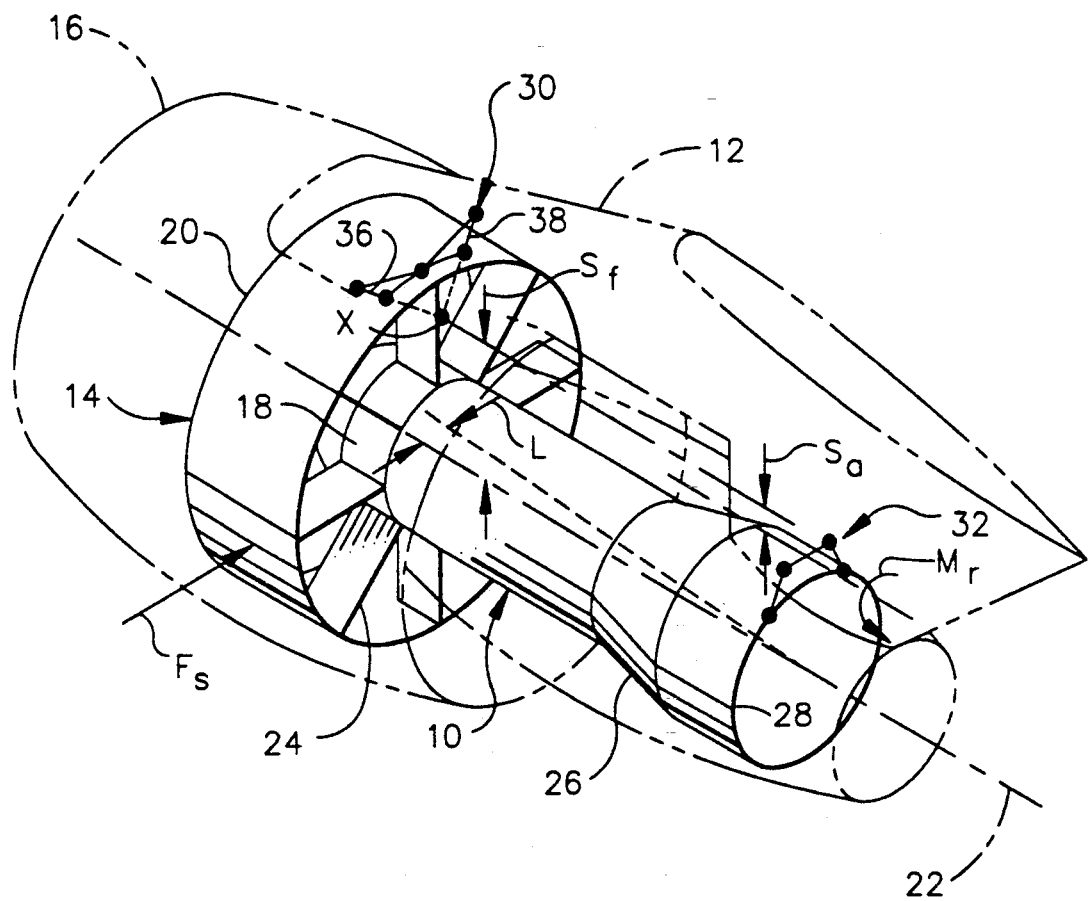
FIG. 1 is a perspective, schematic representation of an exemplary turbofan gas turbine engine mounted to an aircraft pylon in accordance with one embodiment of the present invention.

Illustrated schematically in FIG. 1 is an exemplary turbofan gas turbine engine 10 mounted to an aircraft pylon 12 which may be a wing or tail pylon as desired. The engine 10 includes a conventional fan frame 14 disposed inside a conventional nacelle 16, with the frame 14 including a radially inner hub 18 and an annular, radially outer casing 20 conventionally fixedly disposed in the engine 10 coaxially about a longitudinal centerline axis 22 thereof. A plurality of circumferentially spaced apart struts 24 extend between the hub 18 and the casing 20 for carrying loads therebetween. The gas turbine engine 10 further includes a conventional core engine 26 which powers the fan (not shown) disposed forward of the fan frame 14 and which includes a conventional rear frame 28 typically located at the low pressure turbine thereof and spaced longitudinally aft of the fan frame 14.

The engine 10 is mounted to the pylon 12 at the fan frame 14 by a forward mount 30 shown schematically in accordance with one embodiment of the present invention, and at the rear frame 28 by a conventional aft mount 32 shown schematically. The thrust mount of the engine 10 is not illustrated.

Figure 2:
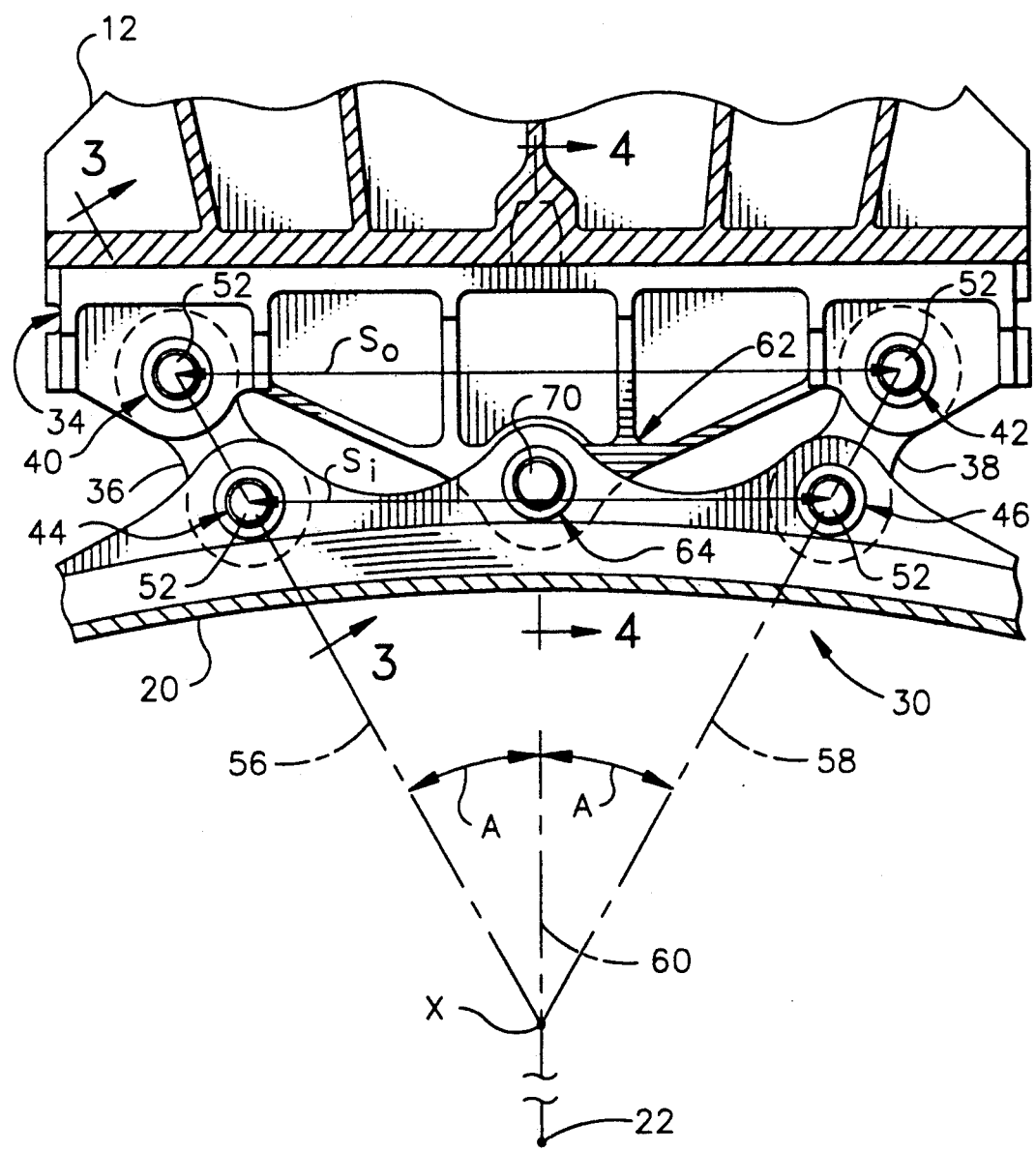
FIG. 2 is an elevation, partly sectional view of the aircraft engine forward mount illustrated in FIG. 1 in accordance with one embodiment of the present invention.

The forward mount 30 is illustrated in more particularity in FIG. 2 and includes a mounting platform 34 spaced radially outwardly from the casing 20 which is conventionally fixedly joined to the pylon 12 by bolts (not shown). The forward mount 30 further includes first and second circumferentially spaced apart links 36, 38, respectively, for carrying loads from the casing 20 to the platform 34 and in turn to the pylon 12. Each of the links 36, 38 is conventionally pivotally joined to the platform 34 at respective radially outer joints 40, 42 disposed at radially outer, proximal ends thereof, and also pivotally joined to the casing 20 at respective radially inner joints 44, 46 disposed at radially inner, distal ends thereof. The first and second links 36, 38 and the outer and inner joints 40–46 are conventional for carrying tension and compressive loads through the links 36, 38, with the joints 40–46 preventing bending stresses therein.

Figure 3:
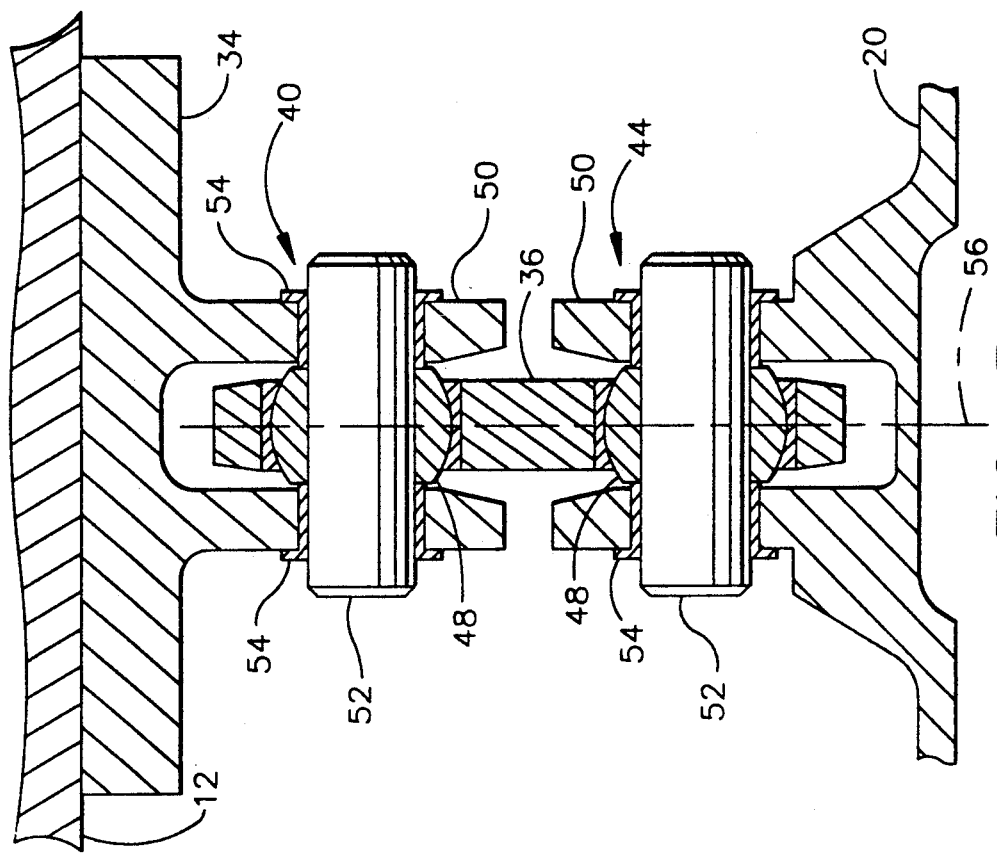
FIG. 3 is a transverse, partly sectional view through one of the forward mount links illustrated in FIG. 2 taken along line 3—3.

FIG. 3 is a cross-section of the first link 36 and its outer and inner joints 40, 44 which is identical in configuration to the second link 38 and its outer and inner joints 42, 46. The first outer joint 40 includes a conventional spherical bearing 48 suitably secured to the proximal end of the first link 36 which is disposed between a clevis 50 formed integrally with the platform 34, with a pin 52 extending through the clevis 50 and the bearing 48 for joining the proximal end of the first link 36 to the platform 34. The first outer joint 40 also includes a pair of conventional bushings 54 between the pin 52 and the apertures of the clevis 50.

The first inner joint 44 is identical to the first outer joint 40 and similarly includes a spherical bearing 48 conventionally joined to the distal end of the first link 36 between a clevis 50 extending from the casing 20, with a pin 52 being disposed through the clevis 50 and the bearing 48 for joining the distal end of the first link 36 to the casing 20. Additional bushings 54 are also provided around the pin 52 for the first inner joint 44. The second outer joint 42 and the second inner joint 46 of the second link 38 shown in FIG. 2 are identical to the outer and inner joints 40, 44 of the first link 36.

In accordance with one object of the present invention, the inner joints 44, 46 of the first and second links 36, 38 are circumferentially spaced closer together than the outer joints 40, 42 of the first and second links 36, 38 in the common axial plane extending perpendicularly to the engine centerline axis 22 as illustrated in FIG. 2. More specifically, the outer joints 40, 42 are spaced laterally apart at an outer spacing $S_o$ on centers thereof, and the inner joints 44, 46 are spaced laterally apart at an inner spacing $S_i$ on the centers thereof. The inner spacing $S_i$ is less than the outer spacing $S_o$ so that the inner joints 44, 46 are closer together than the outer joints 40, 42.

Referring again to FIG. 2, the first link 36 has a longitudinal first axis 56 extending through the centers of the outer and inner joints 40, 44. The second link 38 similarly has a longitudinal second axis 58 extending through the centers of the outer and inner joints 42, 46. And, the first and second axes 56, 58 intersect each other at an intersection point X disposed radially below the first and second links 36, 38 and preferably radially between the engine centerline axis 22 and the inner joints 44, 46 of the first and second links 36, 38 at a radial spacing $S_f$ relative to the centerline axis 22 as shown in FIG. 1.

Furthermore, the first and second links 36, 38 are preferably symmetrically inclined radially inwardly toward each other relative to a radial axis 60 extending outwardly from the engine centerline axis 22 at an acute included angle 2A therebetween. The first link 36 is inclined in one circumferential direction from the radial axis 60 at the acute angle A relative to its first axis 56, and the second link 38 is inclined relative to the radial axis 60 in an opposite circumferential direction at preferably the same acute angle A for collectively defining the acute included angle 2A therebetween. Accordingly, the relative positions of the first and second links 36, 38 form an upright V-configuration with the intersection point X of the first and second axes 56, 58 being located between the engine centerline axis 22 and the links 36, 38 themselves.

The intersection point X provides a center of rotation or a pendulum pivot point about which the casing 20 of the fan frame 14 will tend to pivot and which is disposed substantially radially below the analogous intersection point of conventional outwardly inclined links. Conventional links disposed in an inverted V-configuration provide a longer pivot arm between their intersection point and the center of gravity of the fan frame 14 than that provided by the intersection point X of the links 36, 38 in an upright V-configuration. In this way, lateral deflections L of the fan frame 14 supported by the forward mount 30 as shown in FIG. 1 due to a side force $F_s$ acting on the engine 10 will be reduced over a conventional forward mount. By reducing the radial spacing $S_f$ of the forward mount 30, the lateral deflection L due to the side force $F_s$ will correspondingly decrease. Accordingly, the conventional bleed pipes (not shown) joined to the engine 10 may be designed to accommodate reduced amounts of the lateral deflection L.

Figure 4:
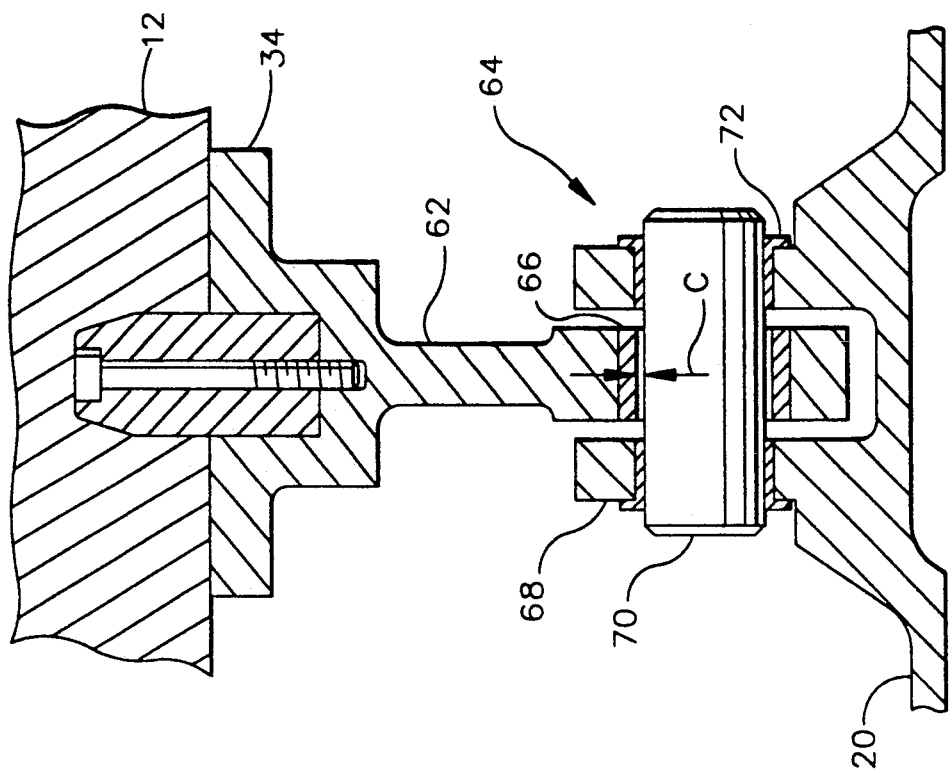
FIG. 4 is a transverse, partly sectional view through a failsafe link of the forward mount illustrated in FIG. 2 taken along line 4—4.

Referring to FIGS. 2 and 4, the forward mount 30 may also include a conventional failsafe, or third, link 62 between the first and second links 36, 38 while still enjoying the benefits of the present invention. A conventional failsafe link usually has radially outer and inner joints between the platform 34 and the casing 20, with the inner joint thereof having a suitable clearance to prevent load carrying except upon failure of one of the two links 36, 38. In the exemplary embodiment illustrated in FIGS. 2 and 4, the failsafe link 62 is disposed circumferentially between the first and second links 36, 38 and extends radially inwardly from the platform 34 to the casing 20. The failsafe link 62 is preferably integrally formed at its proximal end with the platform 34 to provide a rigid load carrying support, and is pivotably joined to the casing 20 at its distal end at a radially inner joint 64 which does not carry any load from the casing 20 to the platform 34 during normal operation, but carries loads therebetween upon failure of one of the links 36, 38.

More specifically, and referring to FIG. 4, the inner joint 64 is conventional and includes a tubular bushing 66 suitably joined through the distal end of the failsafe link 62, with the distal end being disposed between a conventional clevis 68 extending radially outwardly from the casing 20. A pin 70 extends through the clevis 68 and the bushing 66 of the failsafe link 62 to selectively join the failsafe link 62 to the casing 20 during a failure event. The clevis 68 preferably includes a pair of bushings 72 through which the pin 70 extends.

Failsafe operation of the link 62 is effected by providing a predetermined clearance C vertically between the outer circumference of the pin 70 and the inner perimeter of the bushing 66 which prevents load transfer from the casing 20 through the failsafe link 62 to the platform 34 when both the first and second links 36, 38 carry loads therethrough. The clearance C may vary circumferentially around the pin 70 to provide a larger horizontal clearance than vertical clearance as conventionally known. However, upon failure of one of the first and second links 36, 38 to carry its load therethrough, the pin 70 will contact the inner perimeter of the bushing 66 to thus allow vertical load transfer therethrough and through the failsafe link 62 to the mounting platform 34.

As shown in FIG. 2, each of the first and second links 36, 38 intersect the radial axis 60, which radial axis 60 extends upwardly through the failsafe link inner joint 64. Accordingly, upon failure of either one of the first and second links 36, 38, the intersection point between the non-failed link 36, 38 and the failsafe link 62 will remain radially below those links, which reduces lateral deflection of the fan frame 14 during such as failure mode as compared to a conventional forward mount.

Referring again to FIG. 1, the improved forward mount 30 is used in combination with the conventional aft mount 32 in the turbofan engine 10, with the forward mount 30 being located radially above the fan frame 14 and radially above the aft mount 32, and with the aft mount 32 being spaced longitudinally aft of the forward mount 30. The first and second links 36, 38 are also preferably configured so that the intersection point X is spaced both radially below the first and second links 36, 38 themselves and radially above the aft mount 32 at a radial spacing $S_a$ also referred to as a waterline distance. Since the link intersection point X is located radially below the links 36, 38 as compared to conventional links having an intersection point radially above such links, the radial spacing $S_a$ between the intersection point and the aft mount 32 will be reduced. By reducing the radial spacing $S_a$, the side force $F_s$ will effect reduced roll moments $M_r$ at the aft mount 32. Accordingly, the improved forward mount 30 not only is effective for reducing the lateral deflection L in the axial, vertical, plane of the forward mount 30, but it can also reduce the roll moment $M_r$ induced at the aft mount 32 by the side force $F_s$. In this way, the structural design of the aft mount 32 is less affected by the roll moment $M_r$ induced by the side force $F_s$.

The included link angle 2A illustrated in FIG. 2 may be optimized to produce either minimum lateral deflection L of the engine 10 in the axial plane of the forward mount 30, or minimum roll moment $M_r$ at the aft mount 32 under designed-for load conditions. In the preferred embodiment illustrated in FIG. 2, the inclination angles A for each of the first and second links 36, 38 is about 30°, with the included angle 2A therebetween being about 60° for providing a configuration for this exemplary application which both reduces the lateral deflection L and the roll moment $M_r$ induced therefrom.

Although the invention has been described for an exemplary embodiment which may include the failsafe link 62, the failsafe link 62 may be omitted if desired. In such an embodiment, a suitable alternate failsafe load path may be provided, for example through the conventional thrust reverser (not shown). Furthermore, a conventional load spreader (not shown) may be provided along the casing 20 to improve the rigidity of the casing 20 and improve the load spreading therefrom to the fan frame struts 24.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An aircraft engine mount for mounting a gas turbine engine to an aircraft pylon comprising:
   an annular casing fixedly disposed in said gas turbine engine coaxially with a longitudinal centerline axis thereof;
   a mounting platform spaced radially outwardly from said casing, and fixedly joinable to said pylon;
   first and second circumferentially spaced apart links each being pivotally joined directly to said platform at respective radially outer pin and clevis joints, and pivotally joined directly to said casing at respective radially inner pin and clevis joints; and
   said inner joints of said first and second links being circumferentially spaced closer together than said outer joints of said first and second links in a common axial plane extending perpendicularly to said centerline axis.

2. A mount according to claim 1 wherein:
   said first link has a longitudinal first axis extending through said outer and inner joints thereof;
   said second link has a longitudinal second axis extending through said outer and inner joints thereof; and
   said first and second axes intersect each other at an intersection point disposed radially between said engine centerline axis and said first and second links.

3. A mount according to claim 2 wherein said first and second links are symmetrically inclined radially inwardly toward each other relative to a radial axis extending outwardly from said engine centerline axis at an acute angle therebetween.

4. A mount according to claim 3 wherein said acute angle is about 60°.

5. A mount according to claim 3 further including a failsafe link disposed circumferentially between said first and second links and extending radially inwardly from said platform to said casing, said failsafe link being pivotably joined to said casing at a radially inner joint having a predetermined clearance therein for preventing load transfer from said casing and through said failsafe link to said platform when both said first and second links carry load, while allowing vertical load transfer therethrough upon failure of one of said first and second links to carry load therethrough.

6. A mount according to claim 3 wherein:
   said engine is turbofan engine having a fan frame, said casing is an outer casing of said fan frame, and said mount is a forward mount supporting said fan frame;
   said engine further includes an aft mount fixedly joined to said pylon aft of said forward mount; and said first and second links are configured so that said intersection point is spaced both radially below said first and second links and radially above said aft mount.

7. A mount according to claim 6 wherein said acute angle is about 60°.

8. A mount according to claim 7 further including a failsafe link disposed circumferentially between said first and second links and extending radially inwardly from said platform to said casing, said failsafe link being pivotably joined to said casing at a radially inner joint having a predetermined clearance therein for preventing load transfer from said casing and through said failsafe link to said platform when both said first and second links carry load, while allowing vertical load transfer therethrough upon failure of one of said first and second links to carry load therethrough.

* * * * *